Sept. 11, 1928.
B. DUDLEY, JR
1,684,014
METHOD OF ADJUSTING VALVE THROW
Filed July 10, 1924
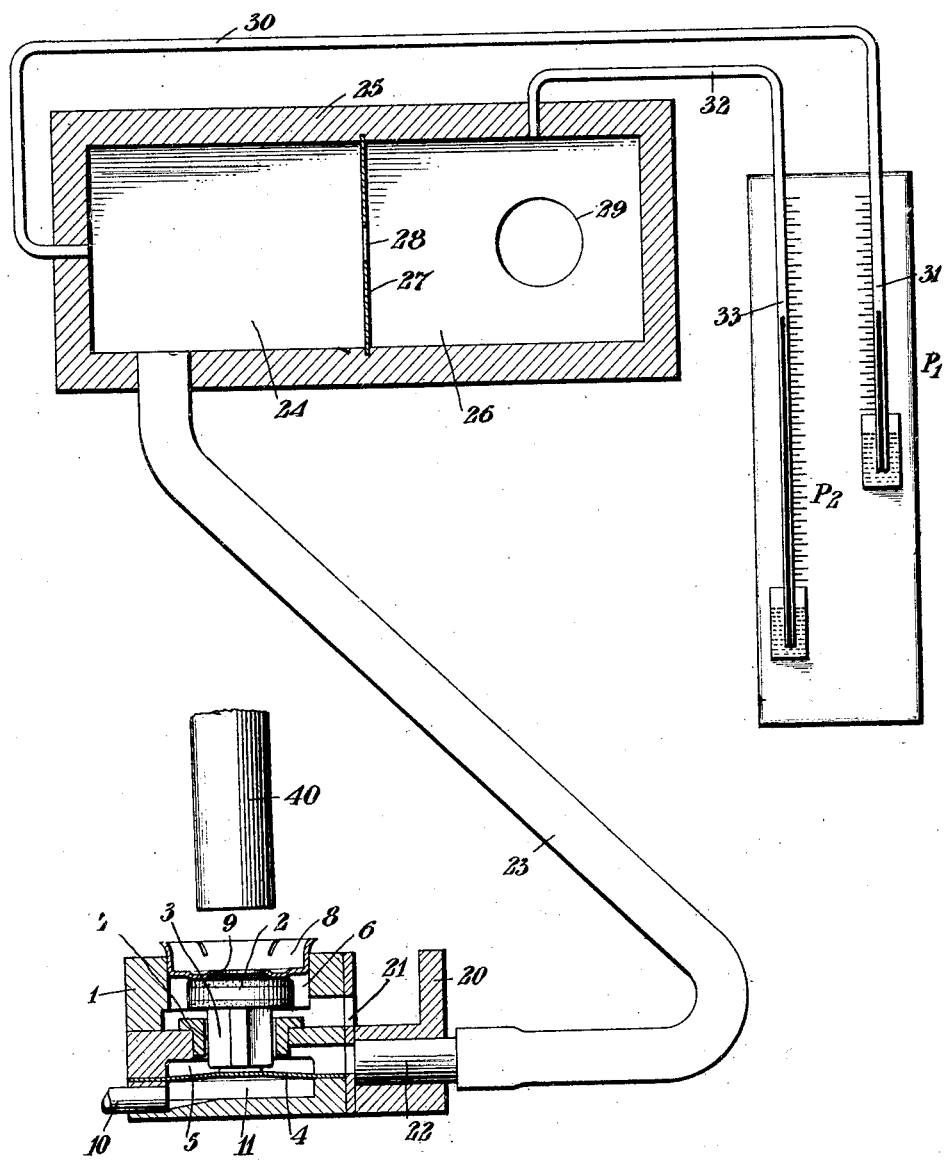
Inventor
Boyd Dudley Jr.
By his Attorneys Patented Sept. 11, 1928.

1,684,014

UNITED STATES PATENT OFFICE.

BOYD DUDLEY, JR., OF SYRACUSE, NEW YORK, ASSIGNOR TO AMERICAN PIANO COMPANY, OF NEW YORK, N. Y., A CORPORATION OF NEW JERSEY.

METHOD OF ADJUSTING VALVE THROW.

Application filed July 10, 1924. Serial No. 725,312.

This invention relates to valves and valve seats and has as one of its objects the provision of a method by which the proper throw of a valve may be accurately determined in order to provide a predetermined flow of fluid through a port controlled by said valve.

It has long been common in the prior art to adjust valves and valve seats with respect to each other in various manners in order that the throw of valves of similar valve units might be substantially the same, so as to provide uniformity in action. Various methods of adjustment have been found useful in securing the proper throw of the valve, as for instance the valve seats have been adjusted with respect to each other, the valve seats have been adjusted with respect to the valve, and the valve has been adjusted with respect to the seats.

In employing any of the methods enumerated above to adjust the valve, it has been necessary to adjust the throw of the valves with respect to some standard in order that duplicate valves would perform with substantial uniformity. The method most commonly employed has consisted simply in measuring lineally the throw of the valve, and by making a proper adjustment to approximate standard conditions.

This method, however, entailed serious difficulties. In the first place, an accurate lineal measurement was difficult to make because in many cases, as particularly in valves used in pneumatic constructions, the valves are faced with leather or other soft material used to insure air-tight contact. Even assuming that the lineal measurement could be accurately made and the throw of the valves standardized in this manner, this method failed to secure uniformity of the flow of fluid through the valve ports controlled by the valves because of surface conditions and other variable elements which could not be accurately taken into account. For instance, in a pneumatic valve construction in which the valve is faced with leather, two valves having exactly the same lineal throw might permit widely varying rates of flow of air because of the varying quality of the leather with which the valve seats are faced or because of surface conditions in the passages within the structure in which the valve is placed.

The present method, which will be described by reference to the accompanying drawing, has as an object to eliminate some of the difficulties described above and to adjust the throw of the valves in such manner that substantially uniform flow of fluid will result, irrespective of the lineal distance through which the valve moves.

The drawing illustrates semi-diagrammatically an apparatus in which the method of the invention may be carried out.

Referring to the drawing, a pneumatic valve action 1 suitable for use in player pianos is illustrated as an example to which the method is applicable, in which it is desired to adjust the throw of the valve in order that the flow of air through the port controlled by the valve may conform to predetermined conditions. The valve action is of the ordinary unit valve type and comprises a valve 2 having a valve stem 3 extending into engagement with a diaphragm 4 for operation thereby in the usual manner. An exhaust chest 5 is provided communicating with the valve chamber 6 through the port 7 in which the valve stem 3 is mounted to reciprocate. The valve chamber 6 is covered by a cap 8 in which is formed a port 9 through which the chamber may communicate with atmospheric air. A duct 10 also communicates with atmospheric air and connects with the diaphragm chamber 11 to cause the valve 2 to be raised by the diaphragm 4 when the exhaust chest 5 is subjected to exhaust.

The valve action to be adjusted is placed in air tight contact with a block 20 having a passage 21 leading to atmospheric air communicating with the valve chamber 6 of the valve action. A passage 22 is also provided in the block 20 communicating with the exhaust chest 5 of the valve action. The passage 22 also communicates with a passage 23 leading to the chamber 24 of the meter box 25. The meter box also comprises an additional chamber 26 separated from the chamber 24 by a plate 27 having an orifice 28 of fixed area therein. The chamber 26 is provided with an opening 29 leading to a pump or other source of pneumatic exhaust not shown. A duct 30 leads from the chamber 24 to the pressure gauge 31 which may conveniently be of the type in which the height of a column of water or other fluid indicates the existing pressure, and a similar duct 32 leads from the chamber 26 to an additional pressure gauge 33.

It may be convenient to arrange the various ducts and passages entering the meter box 25 in such manner that the direct passage of air from one passage to another is avoided, thereby eliminating variations in pressure due to jet effects. For instance, in the embodiment illustrated, the incoming current of air from passage 23 impinges against the upper board of the box and the direct current of air is broken up thereby. Similarly the ducts 30 and 32 enter the box at points off the direct line of the air currents entering and leaving the box.

As soon as air tight contact is established between the action and the block 20, the gauges 31 and 33 will indicate the relative exhaust in the chambers 24 and 26, the gauge 31 registering the exhaust in the chamber 24 due to the constriction imposed by the valve 2 in conjunction with the port 7 and the gauge 32 registering the exhaust in the chamber 26 caused by the constriction imposed both by the passage through the valve action and that imposed by the fixed orifice 28. When contact is first established the gauge 31 will register a much lower degree of exhaust that the gauge 32. The cap 8 may then be driven downwardly by suitable means as by the plunger 40 to increase the constriction imposed by the valve, and the exhaust registered by the gauge 31 will rapidly increase until the exhausts registered by the two gauges reach a predetermined position, at which time the throw of the valve is correctly determined.

The particular relationship between the gauges which is indicative that the correct position of the valve seat has been reached is dependent on the rate of flow of which it is desired the valve shall be capable as well as the area of the fixed orifice 28. The particular size of the orifice 28 and the relationship necessary to produce a given rate of flow can best be determined by experiment. When determined, it may be convenient to arrange the gauges as illustrated, one above the other in such manner that when the correct relationship is established, the water in the two gauges stands at the same level.

As will be observed, the method of the present invention includes the comparison of the flow of air through an orifice of variable size comprising the port 7 and the valve 2, with an orifice of fixed area, and it will be seen, therefore, that when the variable orifice is adjusted to a position such that the flow therethrough reaches a predetermined rate, the two gauges will always assume a fixed relationship with respect to each other. In practice, of course, the process is reversed and the gauges are observed while the valve cap is being driven downward. When the gauges assume their predetermined relationship, it is apparent that the rate of flow through the variable orifice has reached the desired quantity and the throw of the valve will be correctly adjusted. It will be seen, moreover, that while the lineal distance through which the valve moves may vary in different actions the rate of flow of air through the port controlled by the valve will be the same.

It is to be understood that the invention may be modified within the scope of the subjoined claims.

I claim as my invention:

1. The method of adjusting valve throw which includes comparing the flow of fluid through a port controlled by said valve with the flow of the same fluid through an orifice of fixed area and adjusting the effective opening between said port and valve to cause the flow through said port and said orifice to assume a predetermined relationship.

2. The method of adjusting valve throw which includes causing a stream of fluid to flow first through the port controlled by said valve and then through an orifice of fixed area, and adjusting the effective opening between said port and valve to cause the pressure on the opposite sides of said orifice to assume a predetermined relationship.

3. The method of adjusting valve throw which includes drawing fluid first through a port controlled by said valve and then through an orifice of fixed area, measuring the drops in pressure in said fluid caused by its passage through said port and orifice and adjusting the effective opening between said port and valve to cause the respective drops in pressure to assume a predetermined relationship.

4. The method of setting valve throw to permit a predetermined rate of flow through the port controlled by said valve which includes drawing fluid first through said port and then through a passage in which is interposed an orifice of fixed area, and causing the drops in pressure due to the constrictions imposed in said passage by said valve controlled port and orifice to assume a predetermined relationship.

In testimony whereof I have signed my name to this specification this eighth day of July, 1924.

BOYD DUDLEY, JR.